US011019476B2

(12) United States Patent
Ferrari et al.

(10) Patent No.: US 11,019,476 B2
(45) Date of Patent: May 25, 2021

(54) COMMUNICATION DEVICE HAVING A DUAL PROTOCOL WIRELESS INTERFACE

(71) Applicant: Sonova AG, Staefa (CH)

(72) Inventors: Federico Ferrari, Bern (CH); Amre El-Hoiydi, Neuchâtel (CH)

(73) Assignee: Sonova AG, Staefa (CH)

( * ) Notice: Subject to any disclaimer, the term of this patent is extended or adjusted under 35 U.S.C. 154(b) by 0 days.

(21) Appl. No.: 16/484,470

(22) PCT Filed: Feb. 10, 2017

(86) PCT No.: PCT/EP2017/052970
§ 371 (c)(1),
(2) Date: Aug. 8, 2019

(87) PCT Pub. No.: WO2018/145756
PCT Pub. Date: Aug. 16, 2018

(65) Prior Publication Data
US 2020/0100089 A1 Mar. 26, 2020

(51) Int. Cl.
*H04W 8/00* (2009.01)
*H04W 4/80* (2018.01)
(Continued)

(52) U.S. Cl.
CPC .......... *H04W 8/005* (2013.01); *H04R 25/554* (2013.01); *H04W 4/80* (2018.02);
(Continued)

(58) Field of Classification Search
CPC ...... H04Q 7/20; H04M 1/00; H04M 2250/06; H04M 1/6066; H04M 2250/02;
(Continued)

(56) References Cited

U.S. PATENT DOCUMENTS 7,020,467 B2 * 3/2006 Tada ................ H04W 52/0232
455/434
8,457,554 B2 6/2013 Hall et al.
(Continued)

FOREIGN PATENT DOCUMENTS

EP 1113690 A2 7/2001
EP 1392023 A3 * 6/2004 ............ H04W 16/14
(Continued)

OTHER PUBLICATIONS

European Patent Office, International Searching Authority, International Search Report for PCT/EP2017/052970, Aug. 16, 2018, Rijswijk, Netherlands.

*Primary Examiner* — Pablo N Tran

(57) ABSTRACT

There is provided a communication device having a wireless interface (20) including a transceiver (28) and a controller (38) configured to use the transceiver when applying a first protocol, which is a Bluetooth BR/EDR protocol, and also when applying a second protocol, which is suitable for audio streaming, and to use the transceiver for a Bluetooth BR/EDR inquiry scan and/or page scan procedure for data packets sent by an external device (40), wherein the scan procedure comprises a set of N scan segments during which the transceiver is used for inquiry/page scanning, each scan segment having a start time and a frequency, wherein each scan segment is executed during idle times of the second protocol; wherein the duration of each scan segment is at least 1,0055 ms and less than 10.625 ms; wherein the set of scan segments comprises at least two different frequencies and wherein the frequency changes more often than every 1.28 sec.

19 Claims, 6 Drawing Sheets

(51) Int. Cl.
   *H04R 25/00* (2006.01)
   *H04B 1/38* (2015.01)
   *H04M 1/00* (2006.01)
   *H04W 88/06* (2009.01)

(52) U.S. Cl.
   CPC ...... *H04R 25/552* (2013.01); *H04R 2225/021* (2013.01); *H04R 2225/023* (2013.01); *H04R 2225/025* (2013.01); *H04R 2225/51* (2013.01); *H04W 88/06* (2013.01)

(58) Field of Classification Search
   CPC .... H04B 1/38; H04W 72/0446; H04W 16/14; H04W 88/06; H04W 36/28; H04W 8/005; H04W 4/80; H04R 25/554; H04R 25/552; H04R 2225/021; H04R 2225/023; H04R 2225/025; H04R 2225/51
   See application file for complete search history.

(56) References Cited

U.S. PATENT DOCUMENTS

| | | | |
|---|---|---|---|
| 8,509,685 B2 | 8/2013 | Landmark | |
| 8,520,586 B1 | 8/2013 | Husted et al. | |
| 8,571,475 B2 | 10/2013 | Sen et al. | |
| 8,649,734 B1 | 2/2014 | Lin et al. | |
| 9,210,520 B2 * | 12/2015 | Solum | H04R 25/554 |
| 9,504,076 B2 * | 11/2016 | El-Hoiydi | H04W 84/18 |
| 10,165,192 B2 * | 12/2018 | Oshima | G06Q 30/0246 |
| 10,306,380 B2 * | 5/2019 | Roeck | H04R 25/30 |
| 2007/0275746 A1 | 11/2007 | Bitran | |
| 2013/0040574 A1 | 2/2013 | Hillyard | |
| 2017/0105076 A1 * | 4/2017 | Gehring | H04R 25/305 |

FOREIGN PATENT DOCUMENTS

| | | | | |
|---|---|---|---|---|
| EP | 2611236 A1 * | 7/2013 | ............ | H04W 76/28 |
| WO | WO-2007027465 A1 * | 3/2007 | ............ | H04W 68/00 |

* cited by examiner

COMMUNICATION DEVICE HAVING A DUAL PROTOCOL WIRELESS INTERFACE

The invention relates to a communication device, in particular a hearing device, having a wireless interface which uses, as a first protocol, a Bluetooth BR/EDR ("Bluetooth classic") protocol.

In order to connect a first device to a second device, the Bluetooth classic protocol foresees activities called "inquiry", "inquiry scan", "page" and "page scan", respectively. Thereby, the first device, by inquiring, is allowed to discover a second device which performs inquiry scanning; after detection, the first device, by sending paging messages, may establish a connection with the second device which is performing page scanning. In other words, according to Bluetooth classic, one device may send inquiry or page messages, with another device searching/listening to such messages by a procedure called "scanning". While Bluetooth classic in general uses 79 frequencies, 32 of these frequencies are allowed to be used in inquiry and page activities.

In general, inquiry and page procedures are very similar and consist in transmitting a "train" of messages using 16 pseudo-random hopping frequencies (such train is called "inquiry train" or "page train"). The distance between two consecutive inquiry/page packets alternates between 312.5 µs and 937.5 µs, with each train being repeated every 10 ms. Within a train, for each packet a different one of the 16 frequencies is used subsequently.

While the selection of the 16 presently used frequencies from the 32 allowed frequencies is complex and depends on low-level information such as the current value of the Bluetooth clock, two main rules generally apply: (1) every 1.28 s one of the 16 frequencies presently used is replaced by one of the 16 frequencies presently not used; and (2) every 2.56 s all 16 frequencies presently used are replaced by the 16 frequencies presently not used (this process is also referred to as "train switching").

The inquiry scan procedure and the page scan procedure are also very similar and consist in listening for at least 10.625 ms (by default, for 11.25 ms) on one pseudo-random frequency out of the 32 allowed frequencies. These listening windows are repeated periodically, typically every 2.56 s for inquiry scan and every 1.28 s for page scan, with every new window using a different pseudo-random hopping frequency out of the 32 allowed frequencies.

This specification ensures that, if the inquiring/paging device uses the correct train (the term "correct train" as used hereinafter refers to a train which is in conformity with Bluetooth Classic specification), the scanning device has at least one chance to receive a packet by performing a single scan window. If this is, for some reason, not the case, then the two devices will have a chance to meet at most after 2.56 s when the inquiring/paging device switches train.

In case that the wireless interface of a device uses multiple protocols running concurrently, Bluetooth scan activities typically have to be interleaved with activities based on a second protocol, such as low-delay audio streaming. Such coexistence of the Bluetooth classic protocol with a second protocol, however, may result in degraded scanning performance.

U.S. Pat. No. 8,571,475 B2 relates to a Bluetooth (BT) scanning method, wherein a preliminary scan is performed to detect the energy on a subset of frequencies, which preliminary scan is followed by a full scan if a high energy level is detected.

U.S. Pat. No. 8,509,685 B2 relates to a BT scanning method, wherein the power consumption of radio frequency (RF) analog circuitry is reduced based on the detected RF power while performing a BT scan.

U.S. Pat. No. 8,457,554 B2 relates to a BT scanning method, wherein a BT scan is initiated based on the bandwidth of a signal detected during an initial scan within a certain frequency range.

U.S. Pat. No. 8,649,734 B1 relates to a BT scanning method, wherein it is checked whether an energy pattern corresponding to a BT master device is detected within a received signal before entering a full receive mode for a BT scan.

U.S. Pat. No. 8,520,586 B1 relates to a method of using a BT protocol in the vicinity of a wireless network device using a different protocol, such as a WLAN protocol, wherein the transmit power of a BT inquiry response is adjusted based on the communication frequency separation between the BT protocol and the second wireless network.

It is an object of the invention to provide for a communication device having a wireless interface using both a Bluetooth classic protocol and a second protocol suitable for audio streaming, wherein reliable scanning for other BT devices is enabled during use of the second protocol. It is a further object to provide for a corresponding method.

According to the invention, these objects are achieved by a communication device as defined in claim 1 and a method as defined in claim 19, respectively.

The invention uses scan segments having a duration between 1.0055 ms and less than 10.625 ms, which is shorter than the BT scan window duration of at least 10.625 ms, wherein the frequency of the scan segments changes more often than every 1.28 s, with at least two different frequencies being used for the scan segments of a scan procedure (according to the BT specification a frequency change of the scan window is foreseen every 1.28 s). Preferably, an overlap condition is applied to the selected set of scan segments so as to ensure that the selected set of scan segments comprises at least one scan segment which overlaps in time and frequency with at least one data packet sent by an external device that uses the correct train when inquiring or paging using the BT classic protocol.

Thereby the scan actions may be performed during idle times of the second protocol used for audio streaming, thereby allowing for an interleaved use of the BT classic protocol and the audio streaming protocol, while ensuring that the communication device nevertheless is able to reliably receive BT inquiry or page messages.

The communication device preferably is a hearing device.

Preferred embodiments of the invention are defined in dependent claims.

Hereinafter, examples of the invention will be illustrated by referenced to the attached drawings, wherein.

Figure 1:
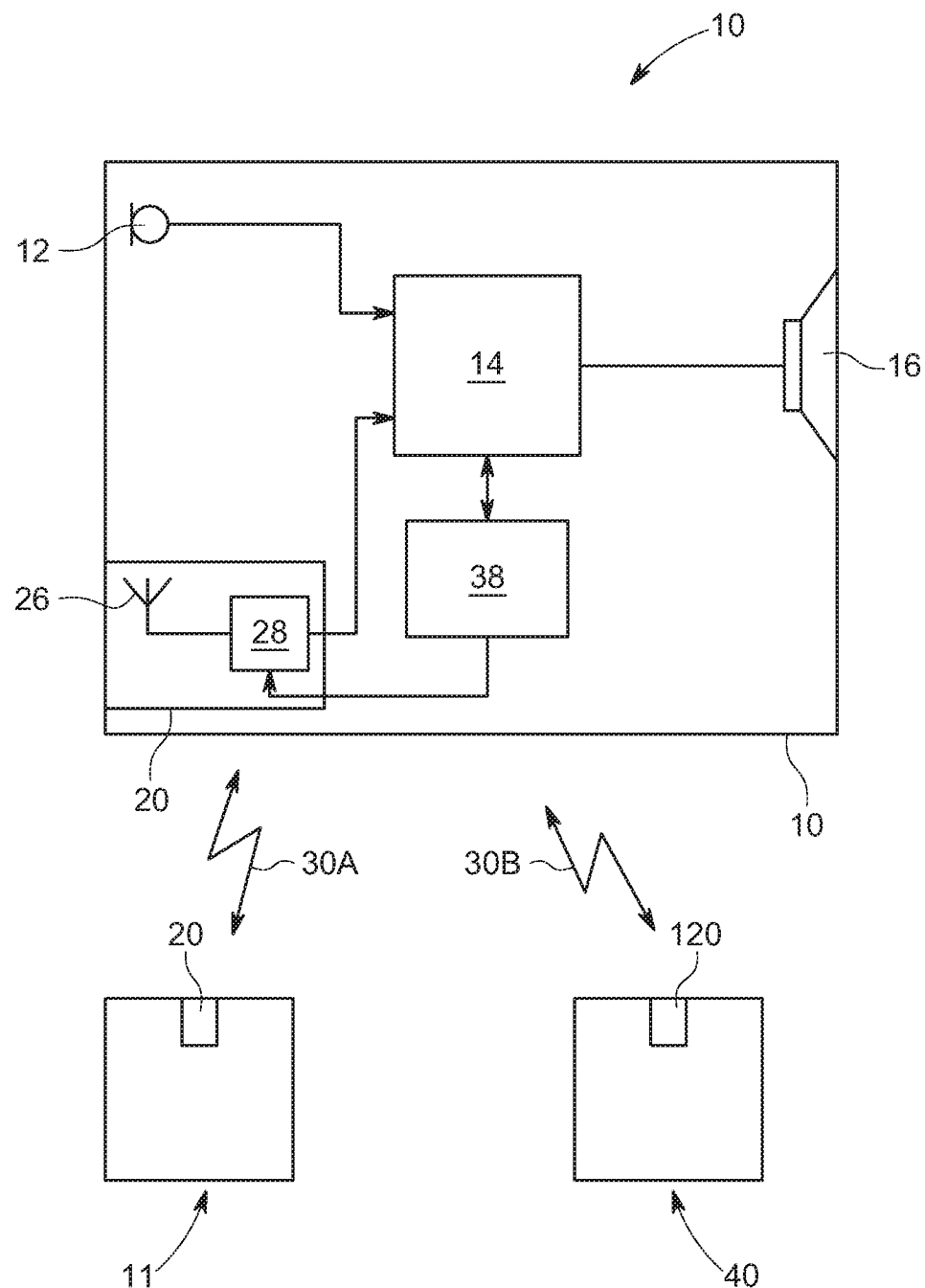
FIG. 1 is a schematic block diagram of an example of a hearing device according to the invention when used with external devices.

FIG. 1 is a block diagram of an example of a first hearing device 10 to be worn at one ear of a user which typically is used together with a second hearing device 11 to be worn at the other ear of the user. The first and second hearing devices 10, 11 are ear level devices and together form a binaural hearing system. Preferably, the hearing devices 10, 11 are hearing instruments, such as RIC (receiver in the canal), BTE (behind-the-ear), ITE (in-the-ear), ITC (in the canal) or CIC (completely-in-the-canal) hearing aids. However, the hearing devices, for example, also could be an auditory prosthesis, such as a cochlear implant device comprising an implanted cochlear stimulator and an external sound processor which may be designed as a BTE unit with a headpiece or as an integrated headpiece.

In the example of FIG. 1, the hearing devices 10, 11 are hearing aids comprising a microphone arrangement 12 for capturing audio signals from ambient sound, an audio signal processing unit 14 for processing the captured audio signals and an electro-acoustic output transducer (loudspeaker) 16 for stimulation of the user's hearing according to the processed audio signals (these elements are shown in FIG. 1 only for the hearing aid 10). For example, the audio signal processing in the unit 14 may include acoustic beamforming (in this case, the microphone arrangement 12 comprises at least two spaced apart microphones).

The hearing aids 10, 11 comprise a wireless interface 20 comprising an antenna 26 and a transceiver 28. The interface 20 is provided for enabling wireless data exchange between the first hearing aid 10 and the second hearing aid 11 via a wireless link 30A which serves to realize a binaural hearing assistance system, allowing the hearing aids 10, 11 to exchange audio signals and/or control data and status data, such as the present settings of the hearing aids 10, 11.

The interface 20 is also provided for data exchange via a wireless link 30B from or to an external device 40 having a BT Classic (BT BR/EDR) interface 120, for example for receiving an audio data stream from an external device acting as an audio source, or data from an external device acting as a remote control. For example, the external device 40 may be a smartphone.

The interface 20 of the hearing aid 10 services BT Classic as a first protocol for data exchange with the external device 40 and a second protocol suitable for audio streaming, in particular from the other hearing aid 11 or from an external wireless microphone (not shown in FIG. 1), such as a proprietary or standard isochronous protocol, in time-multiplex within the same frequency band (i.e. the 2.4 GHz band).

The hearing aids 10, 11 also comprise a control unit 38 for controlling operation of the hearing aids 10, 11, with the control unit 38 acting on the signal processing unit 14 and the transceiver 28. The signal processing unit 14, the transceiver 28, and the control unit 38 may be implemented in a single chip or in different chips.

Figure 2:
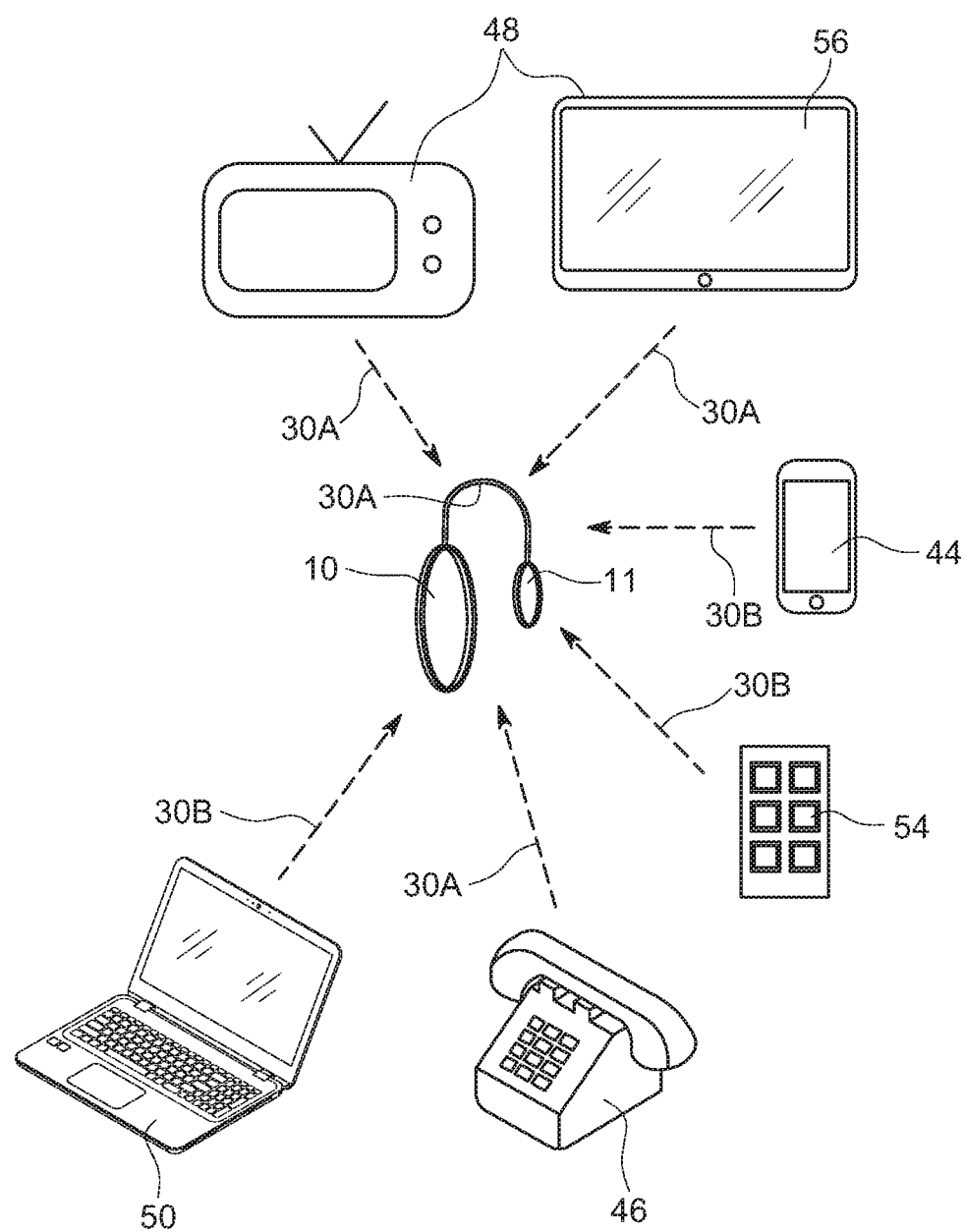
FIG. 2 is an illustration of an example of a use situation of a hearing device with external devices.

In the example of FIG. 2, the hearing device 10 is connected via connections 30A or 30B to a smartphone 44, a telephone device 46, a media streamer 48, a remote control 54, a tablet 56 and a fitting station 50.

An isochronous protocol used to exchange low-latency audio data typically requires frame periods that are not longer than 10 ms. In order to optimize coexistence of such (second) protocol with BT classic protocol used by the same interface 20 (i.e. by the same transceiver 28) it is preferred to synchronize and align the second protocol to the BT clock and to use for the second protocol a frame period that is a multiple of the basic BT frame period. Thus, with the basic BT frame period being 1.25 ms, the second protocol preferably has one of the following periods: 2.5 ms, 3.75 ms, 5 ms, 6.75 ms, 7.5 ms, 8.75 ms or 10 ms. For example, the second protocol may have a frame period of 2.5 ms, which is small enough to keep the binaural audio transport delay via the binaural link 30A on the order of 6 ms.

Consequently, under these circumstances the duration of at least 10.625 ms of the scan window in BT classic is not compatible with the synchronized interleaved use of the second protocol, since such long scan duration would violate the requirement of being performed only during idle times of the second protocol. As a consequence, scanning action would prevent the reception of one or more consecutive audio frames and therefore introduce delays or gaps in the audio stream that is based on the second protocol.

According to the present invention the BT inquiry scan and page scan is divided into scan segments in such a manner that scanning takes place only during idle times of the second protocol. For example, in case of a frame period of 2.5 ms of the second protocol, the inquiry scan and page scan are segmented in such a manner that the time interval between the starting points of 2 scan segments is a multiple of 2.5 ms, with the duration of each scan segment being not more than 1.25 ms (due to transceiver switching times, the duration of each scan segment usually is shorter). Such interleaved use of the interface 20 (i.e. of the transceiver 28) by the hearing device 10 for BT page scanning and audio streaming via a second protocol is illustrated in FIG. 3, wherein the activity of the hearing aid 10 is shown in the upper part and the activity of the other hearing aid 11 is shown in the lower part.

However, simply dividing a BT scan window using a certain frequency into several shorter scan segments using the same frequency does not guarantee that the scanning device will always receive an inquiry or page packet, even if the inquiring/paging device uses the correct BT train. The reason is that according to the BT specification, as already mentioned above, an inquiry/page train of 16 packets is repeated using the same 16 frequencies with a period of 10 ms, which may be a multiple of or have some common dividers with the frame period of the second protocol, so that an unfavorable phase shift could make a connection setup impossible.

Figure 3:
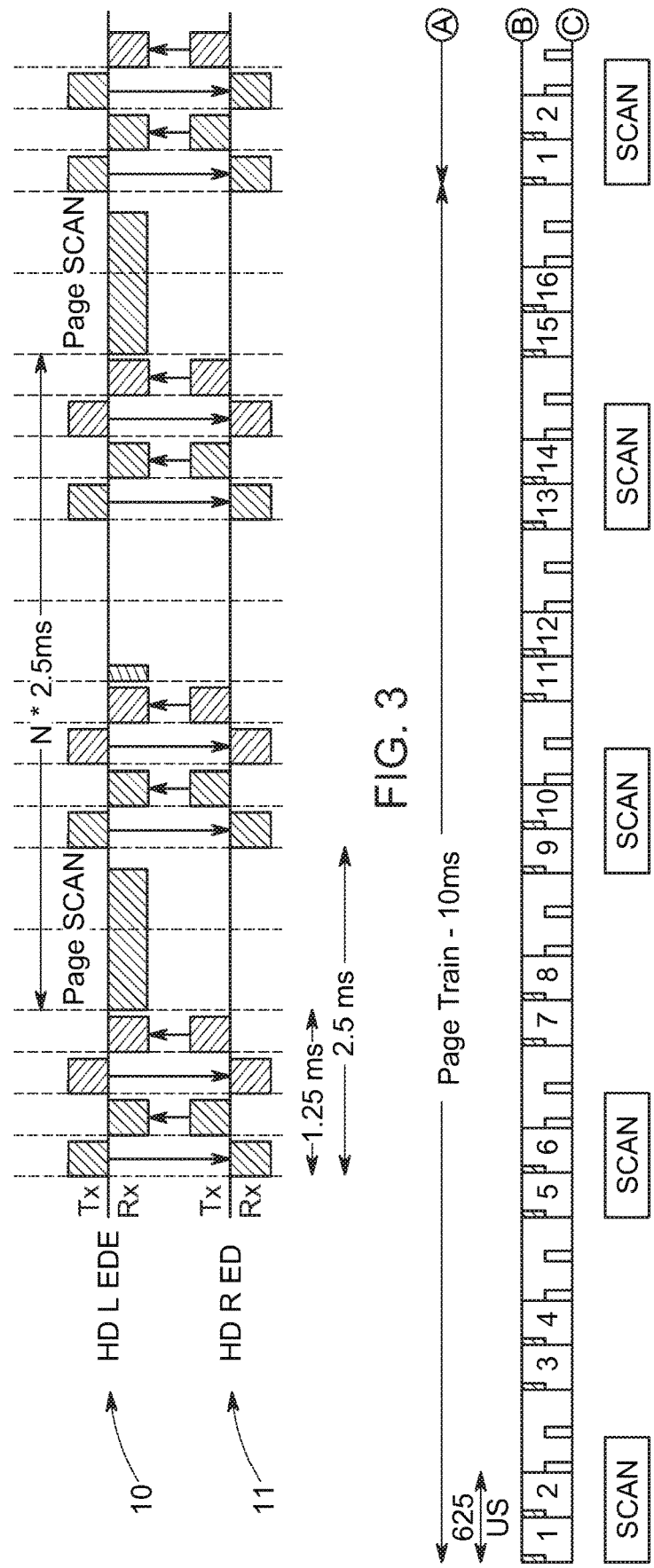
FIG. 3 is an example of a data exchange between two hearing devices forming a binaural system when using a proprietary protocol for audio streaming, while one of the devices simultaneously executes a BT scan procedure.
Figure 4:
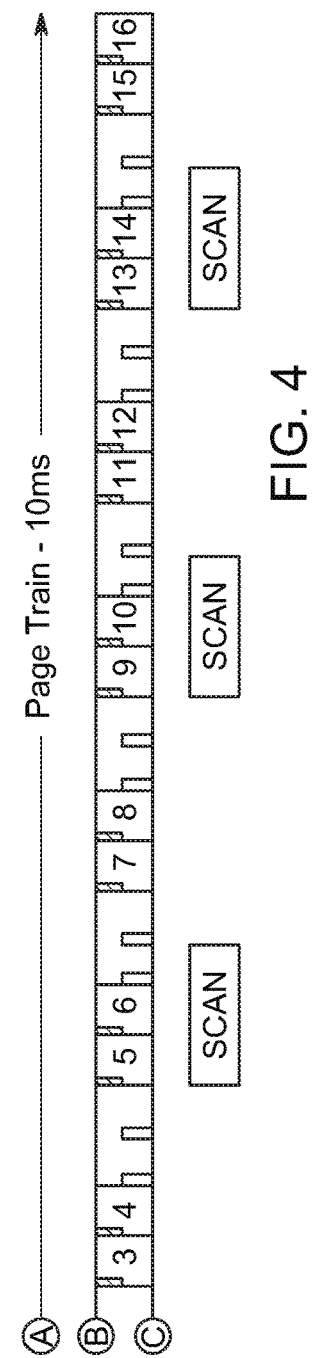
FIG. 4 is an example of synchronicity of a page train and a page scan, wherein the scanning device is able to receive a page packet only at certain frequencies.

Such situation is illustrated in FIG. 4, wherein the scanning action of the hearing device 10 of FIG. 3 is shown for two subsequent page trains, with each page train using frequencies ordered from 1 to 16, starting from frequency 1. If the page packet on frequency 1 is aligned to the beginning of a scan segment, then the scanning device has a chance to receive a page packet only if it is scanning on either of frequencies 1, 2, 5, 6, 9, 10, 13 or 14. However, when the paging device transmits a packet on one of the other eight frequencies, the scanning device will be always occupied with exchanging audio packets in the second protocol, so that it could not receive the packet. In other words, in such case the scanning device could receive the page packet only if the scan segments use one of frequencies 1, 2, 5, 6, 9, 10, 13 or 14, while it would not receive the page packet if the scan segments use one of frequencies 3, 4, 7, 8, 11, 12, 15 or 16.

In order to ensure that the scanning device always will receive at least one of the inquiry/page packets, a set of scan segments has to be carefully selected for the scan procedure, which requires to select the number N of the segments, the start times of the segments and the frequencies of the segments such that, for a given duration of each scan segment (which is primarily determined by the idle times of the second protocol) at least one of the scan segments of the set of scan segments overlaps in time and frequency with at least one inquiry/page packet sent by an external device when inquiring or paging according to the BT classic protocol. To this end, an overlap condition is applied to a set of scan segments in order to check whether for the given set of scan segments at least one of the scan segments overlaps in time and frequency with at least one of the inquiry/page packets. If the result is positive, that set of scan segments is used for the scan procedure; if the result is negative, the current set of scan segments is not sufficient and a different set has to be used.

More in detail, the overlap condition, for a given granularity of time (which preferably is less than or equal to 1 µs; the "granularity" is the minimum time difference between two events in the system), checks, for all possible combinations of time offset and frequency offset between the external device when sending inquiry/page packets and the first scan segment of the set of scan segments, whether there is an overlap in time and frequency of at least one of the inquiry/page packets sent by the external device with at least one of the scan segments of the set of scan segments.

Such method uses the following inputs: the BT inquiry/page repetition period T=10 ms; and the nominal frequency of the scan window (i.e. the frequency which would be used for a scan window according to the BT specification) which, in the present case, is the frequency of the first scan segment f(k). The method further has to take into account the following constraints: the scan segment duration $T_{w\_segm}$, which should be at least 1005.5 µs (in order to always receive at least one inquiry/page packet in the presence of any offset, each scan segment must cover two consecutive inquiry/page packets which have a duration of 937.5 µs+68 µs) and which has to be less than the duration of the idle time of the second protocol; and the scan segment period $T_{segm}$ which corresponds to the scan segment duration plus the scan pause until the next scan segment starts; the scan segment period is determined by the requirement that scan segments have to be placed in the idle times of the second protocol. All scan segments may have the same duration.

Based on these inputs and constraints imposed by the second protocol and the BT specification, an appropriate set of scan segments, including the number of scan segments, the start times and the frequencies, are selected. In general, the set of scan segments comprises at least two different frequencies and the frequency changes more often than every 1.28 s. The start time of each scan segment is a multiple of the scan segment period (i.e., assuming that the first segment starts at the time 0, the second scan segment starts at the time $T_{segm}$, the second segment starts at the time twice $T_{segm}$, etc). The scan segments may be grouped into "phases", wherein each phase relates to a certain frequency different from the other frequencies. The "phase" used here equals the "interlace offset" term used in the Bluetooth core specifications: it is basically an index between 0 and 31 that refers to one of the 32 frequencies available for inquiry/paging, where 0 means the nominal frequency. However, the mapping between this index and the actual channel/frequency depends on several parameters, so that the frequency distance between two adjacent phases may be actually quite large.

Hereinafter, a detailed example of the overlap condition is provided. One considers any possible frequency error between the inquiry/page device and scanning device ε∈K and any possible time offset between inquirer/pager and scanner: $T_{offset} \in [0, T]$. In the following, the combination of frequency error and time offset is referred to as the "offset" between inquirer/pager and scanner. One considers further the current number of scan segments $n_{segm}$, the set of the start times of each segment $\overline{t_{segm\_start}}$, and set of the frequency phases of each segment $\overline{\Delta k}$.

Then one identifies the subset of offsets $\Phi \subseteq K \times [0, T]$ for which a pair of positive integer numbers (i,j) exists such that the i-th inquiry/page packet overlaps in time and frequency with the j-th scan segment, that is, a pair of positive integer numbers (i,j) for which overlap condition (1) defined below is satisfied:

$$\exists\, (i, j) \in \boxed{?} \times \{0, \ldots, n_{segm} - 1\} \text{ such that} \quad (1)$$

$$\begin{cases} 0 \leq \left(\left\lfloor \frac{i}{2} \right\rfloor \times 1250 + (i)(\text{mod}2) \times 312.5\right) \mu s - \\ T_{offset} - t_{segm\_start,j} \leq T_{w\_segm_j} - 68\ \mu s \\ (\varepsilon + 8 + (i)(\text{mod}16))(\text{mod}32) - 16 = \Delta k_j \end{cases}$$

$$\bigvee$$

$$\begin{cases} 0 \leq \left(\left\lfloor \frac{i}{2} \right\rfloor \times 1250 + (i)(\text{mod}2) \times 312.5\right) \mu s - \\ T_{offset} - t_{segm\_start,j} \leq T_{w\_segm_j} - 68\ \mu s \\ (\varepsilon + 8 + (i)(\text{mod}16))(\text{mod}32) - 16 = \Delta k_j \end{cases}$$

If (1) is satisfied for all possible offsets (i.e. if ($\Phi = K \times [0, T]$), then it is guaranteed that inquirer/pager and scanner can meet in time and frequency According to one example, the set of scan segments may be selected by an iterative process, wherein additional scan segments are subsequently added one-by-one to the scan segments already included in the previous set of scan segments until the overlap condition is found to be met by the selected set of scan segments.

Figure 5:
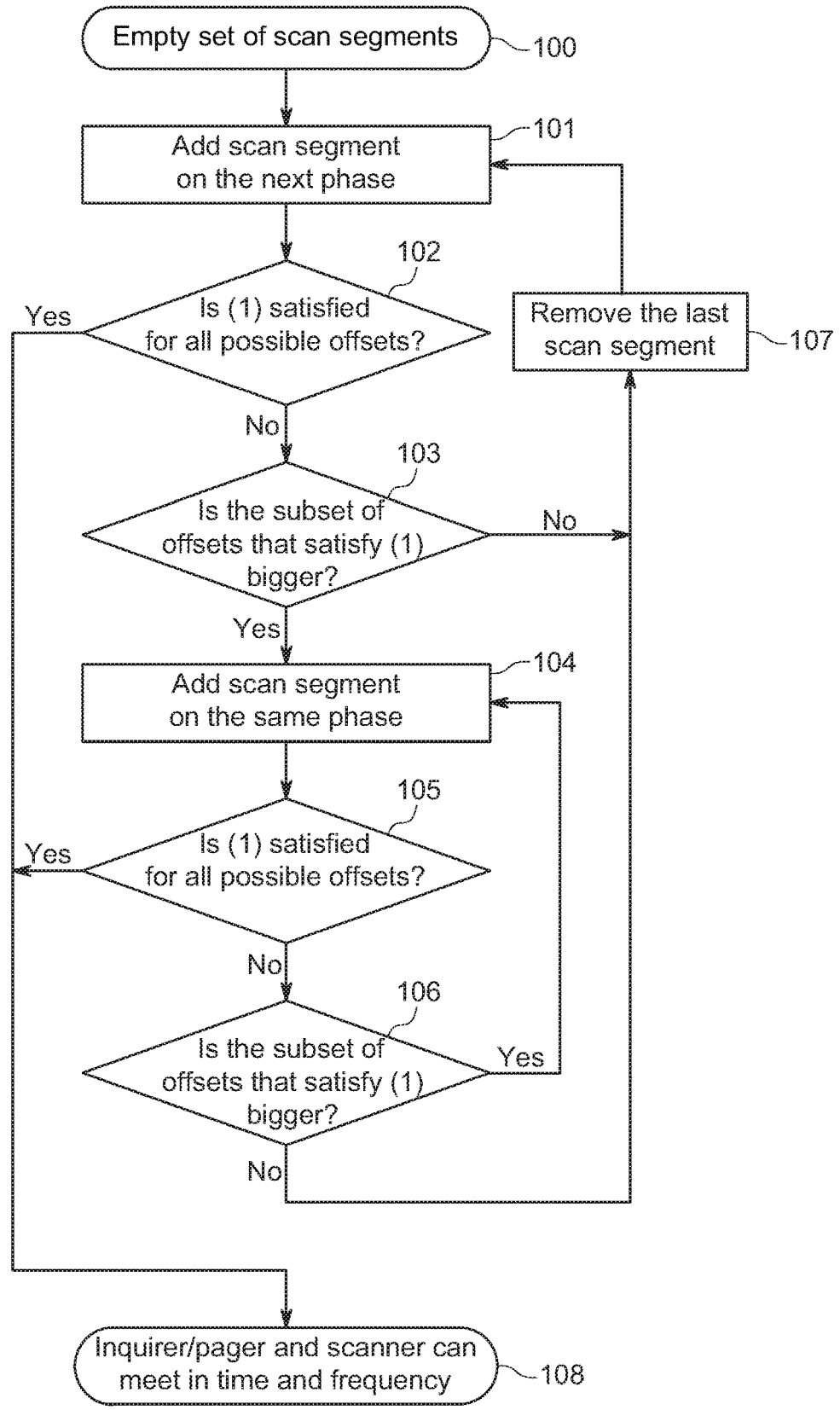
FIG. 5 is an example of a flowchart of a procedure for selecting a set of scan segments.
Figure 6:
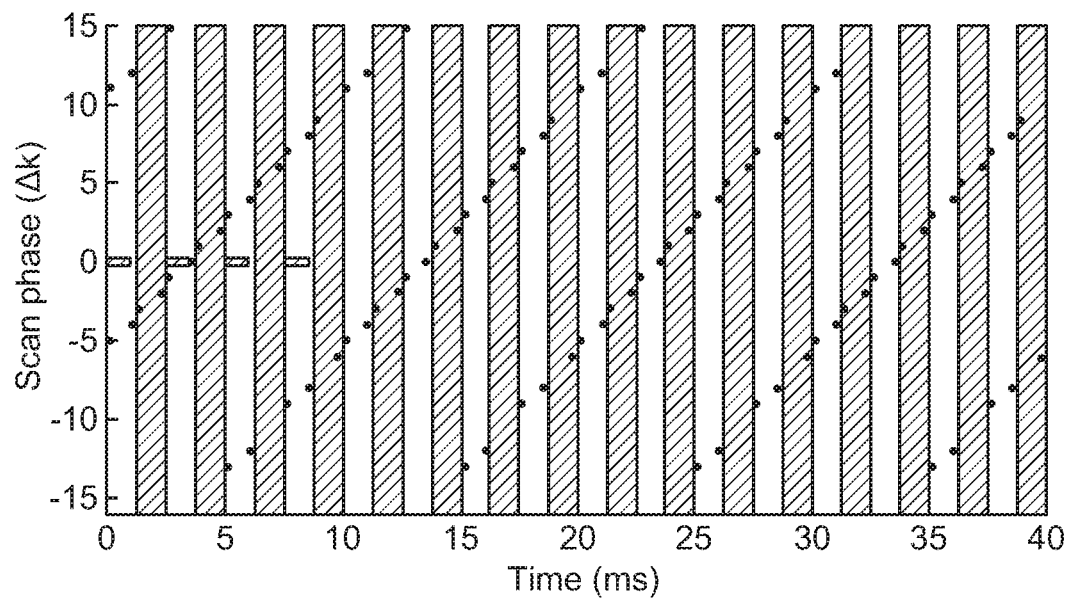
FIGS. 6 to 9 are an illustration of different phases of an example of a scan procedure according to the invention.

An example of such iterative process is illustrated in FIG. 5, wherein the process starts with an empty set of scan segments in step 100, with a (first) scan segment being added to the empty set of scan segments in step 101, with the start time of the first segment being selected according to the second protocol and with the frequency being selected according to the BT specification (the frequency of the first segment corresponds to the frequency of the BT scan window).

In step 102 it is checked, by applying the above overlap condition (1) to the present set of scan segments, whether there is already an overlap in time and frequency of at least one of the scan segments with at least one data packet sent by an external device when inquiring or paging according to the BT specification. If the answer is "yes", the process is terminated and the present set of scan segments is output as the set of scan segments selected for the scan procedure (step 108).

If the answer is "no", it is checked in step 103 whether the subset of offsets (i.e. the number of combinations of time offset and frequency offset) for which the overlap condition is found to be met is larger than the subset of offsets for which for the previous set of scan segments the overlap condition was found to be met.

If the answer to this question is "yes", an additional scan segment having the same frequency (i.e. having the same "phase") is added to the present set of scan segments, thereby creating a new set of scan segments (step 104). Thereafter, the overlap condition is applied to the new set of scan segments (step 105), and, if the overlap condition is found to be met for all offsets, the process is terminated (step 108). If the overlap condition is found to be not met for at least one offset, it is checked, like in step 103, whether for the new set of scan segments the subset of offsets meeting the overlap condition has increased, compared to the former set of scan segments (step 106). If the answer in step 106 is "yes", the process returns to step 104 and a new scan segment having the same frequency as the last added segment is added to the set of scan segments.

If the answer in step 106 is "no", the last added scan segment is removed (step 107) and the process returns to step 101 in which a new scan segment having a new frequency (i.e. a frequency different from the frequencies of the previous scan segments of the set, with the process then continuing by step 102.

If in step 103 the answer is "no", the process continues by removing the last added scan segment in step 107 and returns to step 101.

Typically, the new frequency of the scan segment added in step 101 differs from the preceding frequency (i.e. the frequency of the previously added scan segment) by the minimum frequency difference between BT classic channels.

If the constraints imposed by the second protocol are already known at the time of manufacturing of the hearing device, the above iterative process could be applied during design phase. In this case the results could be already stored into the controller at the manufacturer, so that then there would no need to run the process again during use of the hearing device.

While the iterative process provides for a solution (i.e. for a set of scan segments meeting with the overlap condition) in any case, for some specific cases the solution can be given by an analytical formulation, such as in cases in which the segment period is a multiple of 1.25 ms. In this case, the scan segments are divided into $n_p$ groups each containing $n_{sp}$ scan segments on the same frequency, wherein $n_{sp}$=(duration of the inquiry/page repetition period T (which is 10 ms) divided by the greatest common divisor of the inquiry/page repetition period T and the scan segment period), wherein $n_p = \lfloor 16/(n_{sp} \cdot \Delta k_{min}) \rfloor$ ($\Delta k_{min}$ is the minimum frequency difference between the frequency groups), wherein $$\Delta k_{min} = \max(\lfloor (T_{w\_segm}+312.5 \ \mu s - 68 \ \mu s)/1250 \ \mu s \rfloor,$$

$$2 \cdot \lfloor (T_{w\_segm} - 68 \ \mu s)/1250 \ \mu s \rfloor)$$

This minimum frequency difference corresponds to the number of inquiry/page packets which are fully covered in time by a single scan segment, regardless of its frequency.

The total number of scan segments is $n_p$ times $n_{sp}$. The start times of the segments are multiples of the segment period (which in this case is a multiple of 1.25 ms).

Thus, the output is $$n_{segm} = n_{sp} \cdot n_p$$

$$\overline{t_{segm\_start}} = \{0, T_{segm}, 2 \cdot T_{segm}, \ldots, (n_{sp} \cdot n_p - 1) \cdot T_{segm}\}$$

$$\overline{\Delta k} = \{\underbrace{0, 0, \ldots, 0}_{n_{sp}}, \underbrace{\Delta k_{min}, \Delta k_{min}, \ldots, \Delta k_{min}}_{n_{sp}}, \ldots,$$

$$\underbrace{(n_p-1) \cdot \Delta k_{min}, (n_p-1) \cdot \Delta k_{min}, \ldots, (n_p-1) \cdot \Delta k_{min}}_{n_{sp}}\}$$

An example for a scan segment period of 2.5 ms and a scan segment duration of 1005.5 μs is illustrated in FIGS. 6 to 9; in this case, the analytical formulation discussed above provides for four frequency groups (phases), each including four scan segments with the frequency difference between adjacent frequency groups corresponding to the minimum BT channel difference (i.e. the difference is one channel).

The idle time of the second protocol in this example is 1.25 ms. In this case it follows that $n_{sp}$=4; $\Delta k_{min}$=1; and $n_p$=4, so that $$n_{segm} = 16$$

$$\overline{t_{segm\_start}} = \{0, 2.5, 5, 7.5, 10, 12.5, 15, 17.5, 20, 22.5, 25,$$
$$27.5, 30, 32.5, 35 \ 37.5\} \text{ ms}$$

$$\overline{\Delta k} = \{0, 0, 0, 0, 1, 1, 1, 1, 2, 2, 2, 2, 3, 3, 3, 3\}$$

In the example of FIGS. 6 to 9 the inquiry/page train uses the channel indices having numbers from −6 to +9 in an ascending order (the grey columns in FIGS. 6 to 9 indicate those time intervals which are reserved for the second protocol and which therefore cannot be used for scanning). It can be seen from the example of FIG. 6 that the first frequency group of four scan segments at the nominal BT scan frequency (channel index 0) does not meet in time and frequency with one of the packets of the train (the packets are illustrated by dots in FIGS. 6 to 9, and the scan segments are illustrated by horizontal bars). The first group of segments includes only four segments, since only up to four segments at the same frequency the subgroup of offsets meeting with the overlap condition increases, so that adding a fifth scan segment to the first group would not increase the chance of an overlap with one of the packets.

Figure 7:
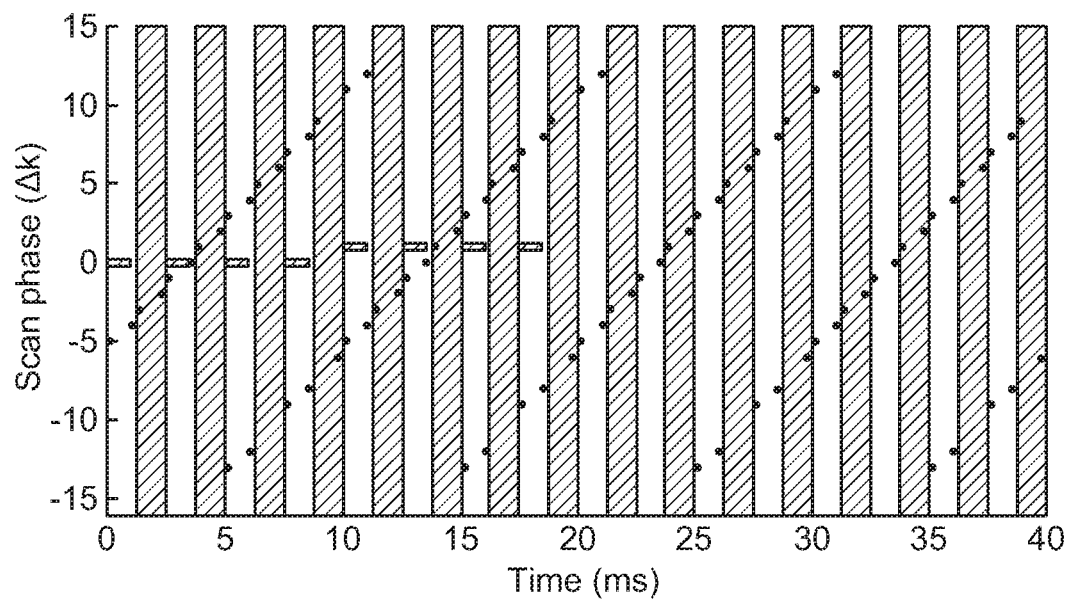
Figure 8:
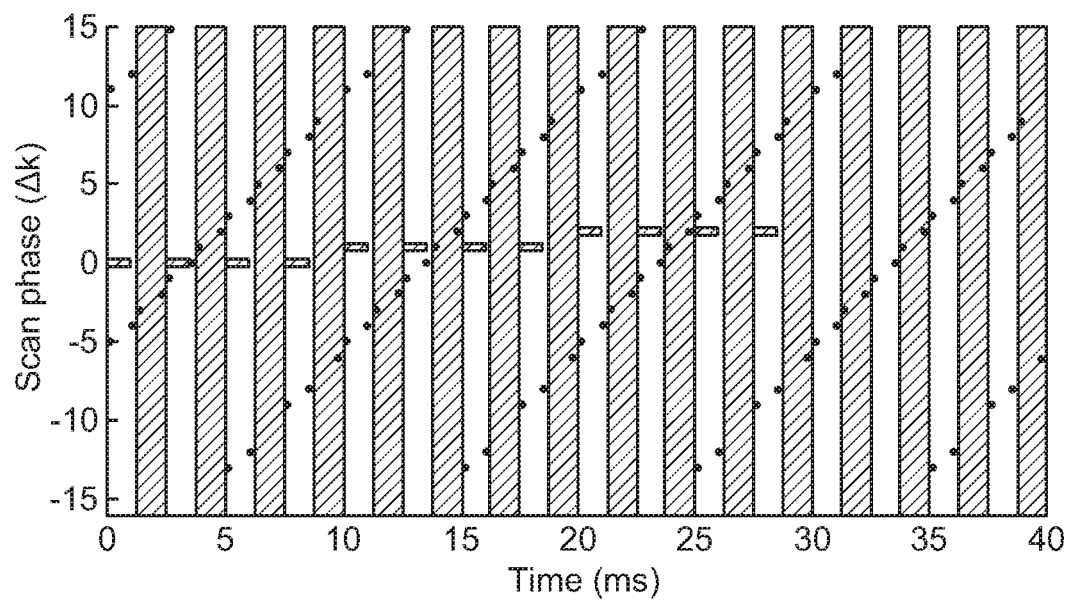
Figure 9:
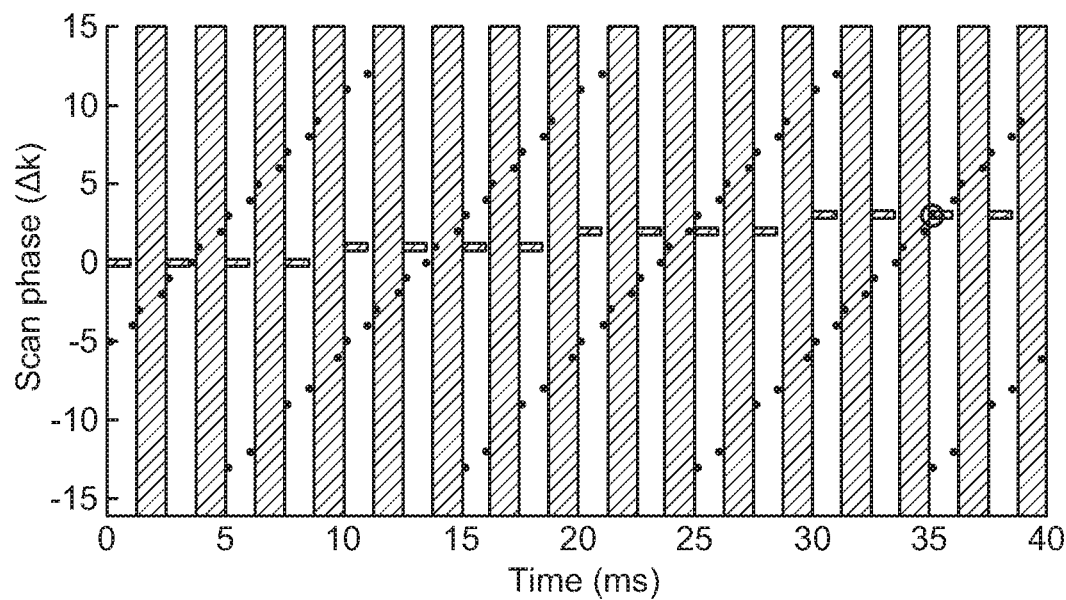

After 10 ms the train is repeated, with the next group of four scan segments having a frequency increased by the minimum frequency difference (plus one channel), thus now using channel 1, see FIG. 7. Also in the second group there is no overlap for the given example. The same applies to the third group of scan segments which use channel 2 (see FIG. 8). According to FIG. 9, the scan procedure now proceeds by the fourth group of scan segments using channel 3. It can be seen in FIG. 9 that for the third scan segment of the fourth group there is an overlap in time and frequency with one of the packets of the train.

The invention claimed is:

1. A hearing device, the hearing device comprising:
   a wireless interface comprising a controller and a transceiver;
   the controller configured to:
   control the transceiver to implement a first protocol and a second protocol,
      wherein the second protocol is suitable for audio streaming, control the transceiver to implement a scan procedure for data packets received from an external device,
      wherein the scan procedure comprises monitoring a set of N scan segments during which the transceiver is used for inquiry or page scanning,
      wherein each scan segment of the set of N scan segments has a start time and a frequency, and
      wherein a duration of each scan segment is at least 1.0055 milliseconds (ms) and less than 10.625 ms,
      wherein the controller is configured to apply an iterative process for selecting the set of N scan segments; and
   the transceiver is configured to:
      execute each scan segment during idle times of the second protocol, and use at least two different frequencies for the set of N scan segments and wherein the transceiver is configured to change frequency used for the each scan segment at least every 1.28 seconds.

2. The hearing device of claim 1, wherein the iterative process comprises:
adding a scan segment of the same frequency as the last previously added scan segment in case that the present set of scan segments is found to increase the number of combinations of time offset and frequency offset for which the overlap condition is found to be met, while there is at least one combination of time offset and frequency offset for which the overlap condition is found to be not met, and
adding a scan segment of a new frequency different from the frequencies of all previous scan segments in case that the present set of scan segments is found to not increase the number of combinations of time offset and frequency offset for which the overlap condition is found to be met, while there is at least one combination of time offset and frequency offset for which the overlap condition is found to be not met, and removing the last previously added scan segment from the present set of scan segments.

3. The hearing device of claim 1, wherein the index of the new frequency differs from the index of the last preceding frequency by 1.

4. The hearing device of claim 1, wherein all scan segments have the same duration.

5. The hearing device of claim 1, wherein the duration of each scan segment is less than 1.25 ms.

6. The hearing device of claim 1, wherein each scan segment is followed by a scan pause so as to form a scan segment period which has the same duration for all scan segments.

7. The hearing device of claim 1, wherein the scan segments are grouped into np frequency groups of nsp scan segments having the same frequency, wherein nsp is 10 ms divided by the greatest common divisor of 10 ms and the scan segment period, wherein np is 16 divided by the product of nsp and a minimum frequency difference kmin between the frequency groups, and wherein $$\Delta k_{min} = \max(\lfloor (T_{w\_segm} + 312.5 \ \mu s - 68 \ \mu s)/1250 \ \mu s \rfloor,$$

$$2 \cdot \lfloor (T_{w\_segm} - 68 \ \mu s)/1250 \ \mu s \rfloor).$$

8. The hearing device of claim 1, wherein the second protocol uses a frame period of not more than 10 ms.

9. The hearing device of claim 1, wherein the second protocol uses a frame period which is a multiple of 1.25 ms.

10. A method for implementing first and second wireless communication protocols for a hearing device, the method comprising:
scanning for data packets received from an external device during ideal times of the second wireless communication protocol,
wherein the scanning comprises a set of N scan segments for inquiry or page scanning,
wherein each scan segment of the set of N scan segments has a start time and a frequency,
wherein the scanning further comprises applying an iterative process for selecting the set of N scan segments,
wherein a duration of each scan segment of the set of N scan segments is at least 1.0055 milliseconds (ms) and less than 10.625 ms,
wherein a time interval between each of the N scan segments is a multiple of 2.5 ms,
wherein the second wireless communication protocol is for audio streaming; and
changing a frequency used for each scan segment at least every 1.28 seconds.

11. The method of claim 10, the method further comprising:
adding a scan segment of the same frequency as the last previously added scan segment in case that the present set of scan segments is found to increase the number of combinations of time offset and frequency offset for which the overlap condition is found to be met, while there is at least one combination of time offset and frequency offset for which the overlap condition is found to be not met, and
adding a scan segment of a new frequency different from the frequencies of all previous scan segments in case that the present set of scan segments is found to not increase the number of combinations of time offset and frequency offset for which the overlap condition is found to be met, while there is at least one combination of time offset and frequency offset for which the overlap condition is found to be not met, and removing the last previously added scan segment from the present set of scan segments.

12. The method of claim 10, wherein the index of the new frequency differs from the index of the last preceding frequency by 1.

13. The method of claim 10, wherein all scan segments have the same duration.

14. The method of claim 10, wherein the duration of each scan segment is less than 1.25 ms.

15. A non-transitory computer readable medium storing instructions, which when executed by a processor cause a device to perform operations for communicating a first and second wireless communication protocol, the operations comprising:
scanning for data packets received from an external device during ideal times of the second wireless communication protocol,
wherein the scanning comprises a set of N scan segments for inquiry or page scanning,
wherein each scan segment of the set of N scan segments has a start time and a frequency,
wherein the scanning further comprises applying an iterative process for selecting the set of N scan segments,
wherein a duration of each scan segment of the set of N scan segments is at least 1.0055 milliseconds (ms) and less than 10.625 ms,
wherein a time interval between each of the N scan segments is a multiple of 2.5 ms,
wherein the second wireless communication protocol is for audio streaming; and
changing a frequency used for each scan segment at least every 1.28 seconds.

16. The non-transitory computer-readable medium of claim 15, the operations further comprising:
adding a scan segment of the same frequency as the last previously added scan segment in case that the present set of scan segments is found to increase the number of combinations of time offset and frequency offset for which the overlap condition is found to be met, while there is at least one combination of time offset and frequency offset for which the overlap condition is found to be not met, and adding a scan segment of a new frequency different from the frequencies of all previous scan segments in case that the present set of scan segments is found to not increase the number of combinations of time offset and frequency offset for which the overlap condition is found to be met, while there is at least one combination of time offset and frequency offset for which the overlap condition is found to be not met, and removing the last previously added scan segment from the present set of scan segments.

17. The non-transitory computer-readable medium of claim 15, wherein the index of the new frequency differs from the index of the last preceding frequency by 1.

18. The non-transitory computer-readable medium of claim 15, wherein all scan segments have the same duration.

19. The non-transitory computer-readable medium of claim 15, wherein the duration of each scan segment is less than 1.25 ms.

\* \* \* \* \*